United States Patent
Laird et al.

(10) Patent No.: US 9,146,146 B2
(45) Date of Patent: Sep. 29, 2015

(54) SYSTEM, METHOD, AND COMPUTER READABLE MEDIUM FOR DETERMINING THE WEIGHT OF ITEMS IN A NON-SINGULATED AND NON-SPACED ARRANGEMENT ON A CONVEYOR SYSTEM

(71) Applicant: PUROLATOR INC., Mississauga (CA)

(72) Inventors: Cameron James Laird, Mississauga (CA); Andrew Silerio Vicencio, Barrie (CA); Kirk Edward Serjeantson, Markham (CA)

(73) Assignee: PUROLATOR INC., Mississauga, Ontario (CA)

( * ) Notice: Subject to any disclaimer, the term of this patent is extended or adjusted under 35 U.S.C. 154(b) by 229 days.

(21) Appl. No.: 13/651,888

(22) Filed: Oct. 15, 2012

(65) Prior Publication Data

US 2013/0092456 A1  Apr. 18, 2013

Related U.S. Application Data

(60) Provisional application No. 61/547,317, filed on Oct. 14, 2011.

(51) Int. Cl.
*G01G 19/00* (2006.01)
*G01G 19/03* (2006.01)
*G01G 19/414* (2006.01)

(52) U.S. Cl.
CPC .............. *G01G 19/00* (2013.01); *G01G 19/035* (2013.01); *G01G 19/4148* (2013.01)

(58) Field of Classification Search
CPC ..... G01G 11/00; G01G 11/04; G01G 19/035; G01G 19/4148; G01G 19/00
USPC ............... 177/25.13, 145, 199, 200; 702/155, 702/175; 705/407, 414
See application file for complete search history.

(56) References Cited

U.S. PATENT DOCUMENTS 4,437,561 A * 3/1984 Hasegawa et al. ............ 177/145
4,709,770 A * 12/1987 Kohashi et al. ................ 177/50

(Continued)

FOREIGN PATENT DOCUMENTS

EP  503502 A2  9/1992
EP  503502 B1  9/1998

OTHER PUBLICATIONS

"Accu-Sort(R) Demonstrates Automation Solutions for Distribution Centers at 2011 RILA Logistics Conference; Accu-Sorta(R) Automation Solutions, including Camera Bar Code Scanners, Print and Apply, and Sortation Systems Help Retailers Improve Speed and Accuracy in Tough Retail Environments", PR Newswire, Feb. 9, 2011, Accu-Sort Systems, Inc., PR Newswire Association LLC / Factiva, Inc., United States.

(Continued)

*Primary Examiner* — Randy W Gibson
(74) *Attorney, Agent, or Firm* — Kevin E. Holbeche; Fasken Martineau DuMoulin LLP

(57) ABSTRACT

A weight determining system is for use with a non-singulated and non-spaced arrangement of items on a conveyor. The system includes an array of load cells, a scanning apparatus, and processors. Each of the items bears upon one or more of the load cells. Each of the load cells bears one or more of the items, and generates load data associated with them. The scanning apparatus generates scan data for the arrangement of the items on the conveyor. Based on the scan data, the processors: apportion the load data from each load cell to the items bearing on it; allocate to each item the load data apportioned from the various load cells; and determine a weight for each item. Also disclosed are a corresponding weight determining method, as well as a computer readable medium containing executable instructions to encode the processors to perform as aforesaid.

31 Claims, 11 Drawing Sheets

(56) References Cited

U.S. PATENT DOCUMENTS

| | | | |
|---|---|---|---|
| 4,754,822 A * | 7/1988 | Altenpohl et al. | 177/145 |
| 5,244,100 A | 9/1993 | Regier et al. | |
| 5,308,930 A | 5/1994 | Tokutu et al. | |
| 5,547,034 A | 8/1996 | Wurz et al. | |
| 6,323,452 B1 | 11/2001 | Bonnet | |
| 6,346,680 B1 * | 2/2002 | Takahashi et al. | 177/1 |
| 6,433,288 B1 * | 8/2002 | Olafsson | 177/145 |
| 6,517,004 B2 | 2/2003 | Good et al. | |
| 6,554,189 B1 | 4/2003 | Good et al. | |
| 6,603,082 B1 * | 8/2003 | Delbruck et al. | 177/132 |
| 6,609,607 B2 | 8/2003 | Woltjer et al. | |
| 6,961,456 B2 | 11/2005 | Bonner et al. | |
| 7,104,454 B2 | 9/2006 | Good et al. | |
| 7,216,013 B2 | 5/2007 | Kibbler | |
| 7,279,644 B1 * | 10/2007 | Kasel | 177/25.13 |
| 7,279,645 B1 * | 10/2007 | Inglin et al. | 177/145 |
| 7,344,082 B2 | 3/2008 | Zhu et al. | |
| 7,357,327 B2 | 4/2008 | Odenthal | |
| 7,377,429 B2 | 5/2008 | Anderson et al. | |
| 7,586,049 B2 * | 9/2009 | Wurz | 177/25.13 |
| 7,750,253 B2 | 7/2010 | Wineland | |
| 8,134,090 B2 * | 3/2012 | Deppre | 177/119 |
| 8,237,067 B2 * | 8/2012 | Troisi et al. | 177/145 |
| 8,674,241 B2 * | 3/2014 | Klauer et al. | 177/1 |
| 2003/0042304 A1 | 3/2003 | Knowles et al. | |
| 2003/0234290 A1 | 12/2003 | Good et al. | |
| 2005/0155978 A1 | 7/2005 | Parets et al. | |
| 2008/0035390 A1 | 2/2008 | Wurz | |
| 2013/0066462 A1 * | 3/2013 | Serjeantson et al. | 700/225 |

OTHER PUBLICATIONS

"Accu-Sort(R) Video Shows how Adding Side-by-Side Package Detection to Bar Code System Cut Costs for Distribution Center; New Video Case Study Explains how AV6010 Bar-Code System with Side-by-Side Package Detection Uncovered Cost Savings", Business Wire, Aug. 30, 2010, Factiva, Inc.

"Adaptive Optics Wins FedEx Package Dimensioning Systems Contract", PR Newswire, Sep. 2, 1997, M2 Communications, Ltd. / Factiva, Inc.

Sagisawa, Shinobu et al., Translation of Abstract of JP Patent / Publication No. 60158327A (Date of Publication: Aug. 19, 1985, Title: "Load Cell Array for Detecting Three Components", Assignee/Applicant: Fuji Electric Corp Res & Dev Ltd, Application Date: Jan. 27, 1984, Application No. JP198413993A).

* cited by examiner

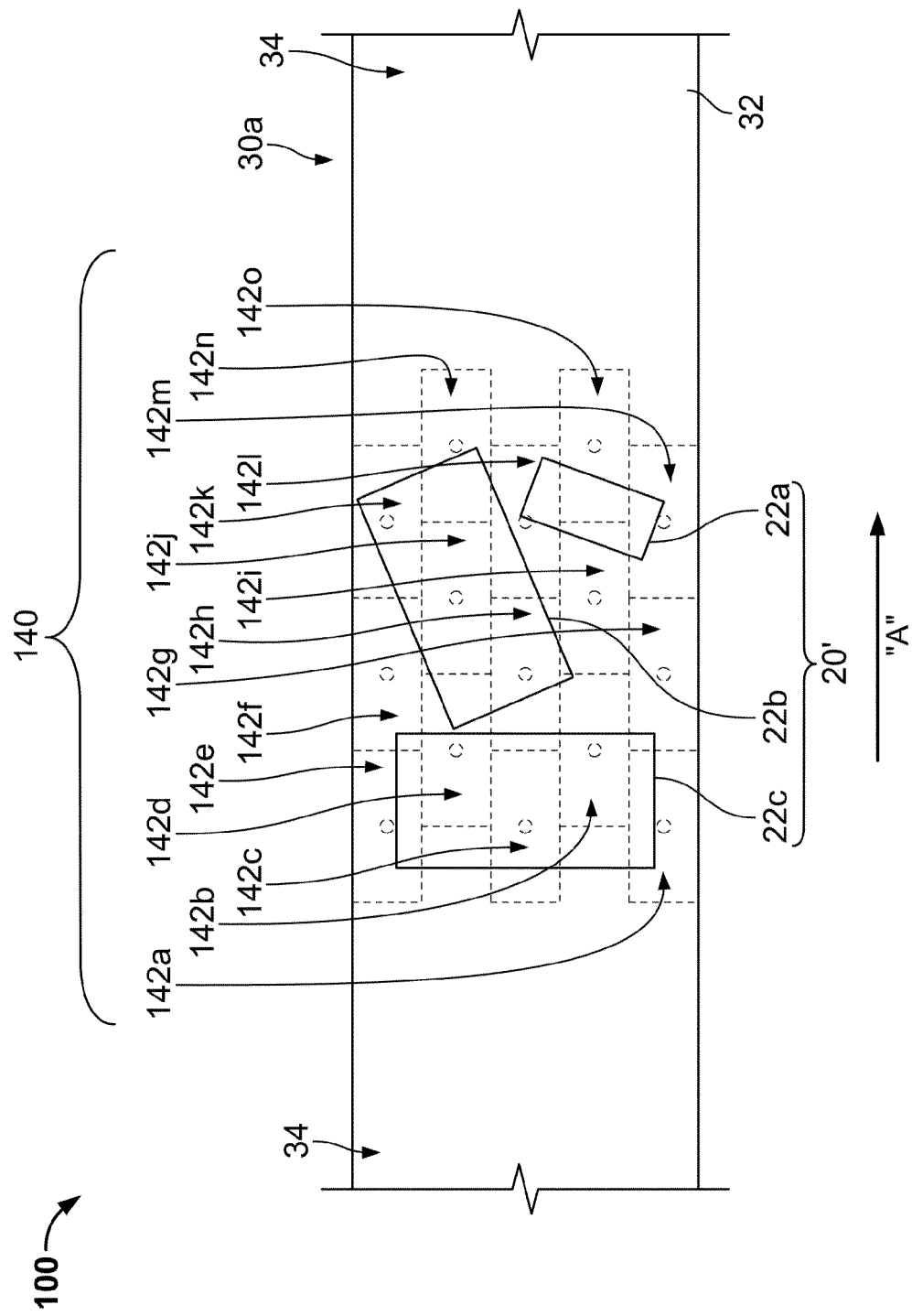

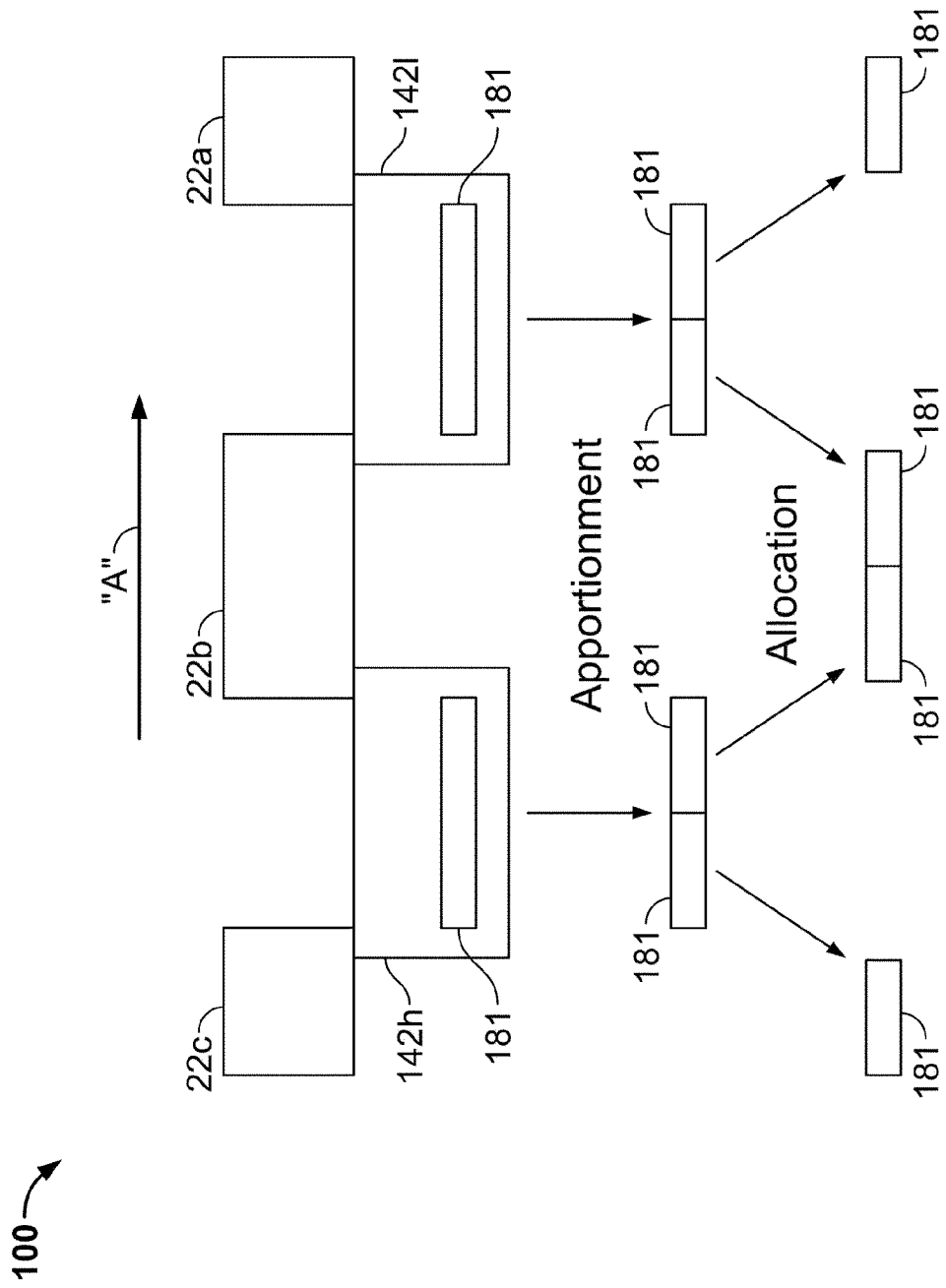

SYSTEM, METHOD, AND COMPUTER READABLE MEDIUM FOR DETERMINING THE WEIGHT OF ITEMS IN A NON-SINGULATED AND NON-SPACED ARRANGEMENT ON A CONVEYOR SYSTEM

FIELD OF THE INVENTION

The present invention relates generally to a weight determining system, method, and computer readable medium, and more particularly to a weight determining system, method, and computer readable medium for use with a non-singulated and non-spaced arrangement of items on a conveyor.

BACKGROUND OF THE INVENTION

In the shipping provider and/or manufacturing industry, weight determining technology may have been used to determine the weights of items on a conveyor for the purpose of revenue recovery. Conveyors (alternately herein referred to as "conveyor systems" and/or "conveying systems") are common pieces of mechanical handling equipment that move materials from one location to another. Many kinds of conveying systems are available, and are used according to the various needs of different industries. Types of conveyor systems, in the prior art, may include (among other things) flexible conveyor systems and heavy duty roller conveyors.

In the prior art, weight determining technology may have included a scale using four load cells arranged at the corners of a solid platform for the determination of item weight. FIGS. 1A and 1B depict plan and side views, respectively, of one such system having a load cell at each corner of the scale wherein the load cells are positioned beneath a conveyor belt. This arrangement of load cells may have calculated item weight by summing and/or averaging the weight determinations from each load cell. Accordingly, this prior art weight determining technology may have only been adapted to determine the weight of a single item, or the average weight of two or more items, at any given time or the weight. In order to determine the weight of a single item, items may have been required to be arranged, with respect to the conveyor's direction of travel, in a singulated (i.e., in single-file and/or in a single row) and spaced manner (i.e., non-abutting and/or with sufficient gaps between items, perhaps so that only one item is on a scale at a given time). FIG. 2 depicts a plan view of items having a singulated and spaced arrangement.

In a shipping provider and/or manufacturing facility, however, items may frequently be received and/or conveyed in a non-singulated arrangement (i.e., not single-file) and/or in a non-spaced arrangement (i.e., abutting or only with very small gaps). The non-singulated arrangement may be either with respect to a direction of travel of the conveyor or a direction that is transverse to the direction of travel of the conveyor. FIG. 3 depicts a plan view of items having a non-singulated and non-spaced arrangement. Non-singulated and/or non-spaced arrangements of items may have presented challenges to previous weight determining technologies, and attempts to determine item weights may not have yielded useful results for items in such arrangements. For example, prior art weight dimensioning technologies may not have been able to distinguish between the respective weights of various items in a non-singulated and/or non-spaced arrangement, in some instances due to an increased chance of there being more than one item on the scale at a given time. This shortcoming may have led to incorrect determination of item weights, to weight-determining errors and/or to an inability to measure item weights. Any previous need for singulated and spaced arrangements may have impaired and/or prevented the ability of a shipping provider to recover revenue, for example, based on weighing and/or reweighing of items and may have required costly manual intervention and/or additional automation. Shipping provider operations that process a high number of items may have been faced with sacrificing any capability to measure items' weights in an effort to achieve targeted clearance times for items. Sacrificing item weight measurement capability may have previously resulted in a loss of revenue.

Customer charges for delivering items may frequently be based on the weights of the items, with greater charges accruing for the delivery of heavier items. In addition, or alternatively, shipping providers may charge customers a premium to deliver overweight items (i.e., items having a weight that is greater than some threshold value). More specifically, for example, previously if a customer provided a courier with an item and declared an item weight less than a threshold value at which premium charges would apply, then the shipping provider may have found it difficult to obtain full payment for shipping the overweight item.

In a disparate though perhaps related field of prior art, dimensioning technologies may have been used to determine dimensions of items on conveyors for the purpose of revenue recovery. While previous dimensioning technologies may have only been capable of determining individual item dimensions for items in a singulated and spaced arrangement, some of prior dimensioning technologies (e.g., the CS5200 or CSN210 MassFlow dimensioners offered by Mettler Toledo of Columbus, Ohio) may have been capable of determining the dimensions of items in a non-singulated and/or non-spaced arrangement. The ability to determine the dimensions of items in a non-singulated and/or non-spaced arrangement may have provided shipping provider and/or manufacturing operations with the capability of processing increased numbers of items without limiting the collection of item dimension information as, for example, the items do not require sorting (i.e., manipulation to achieve a singulated and spaced arrangement) prior to dimension determination. This previous technology may have (i) facilitated revenue recovery and/or (ii) reduced the time required to clear items from a facility towards targeted clearance times for items.

Notably, however, with respect to items having a non-singulated and/or non-spaced arrangement, previous dimensioning technologies may have been limited by a failure to: (i) determine dimensions of items with respect to a conveyor; (ii) determine item dimensions downstream or upstream of the dimensioning apparatus; and/or (iii) interface with weight determining technology so as to also assign individual and accurate weights to single items.

Previous weight determining technologies may have been unable to determine individual weights of items in non-singulated and/or non-spaced arrangements. Persons skilled in the art may have failed to appreciate the problems with the prior art, and/or exactly how previous weight determining and dimensioning technologies might be combined to best solve them. One or more possible combinations of such previous technologies may have been ruled out and/or overlooked by skilled persons as impractical or otherwise. For example, while dimensions of items in non-singulated and/or non-spaced arrangements might be determined, some may have previously considered it necessary for the items to be manipulated into a singulated and/or spaced arrangement to facilitate the determination of individual item weights. Some combinations of the previous technologies may have used dimensioning devices to assess whether items were in a singulated and spaced arrangement.

What may be needed is a system, method or computer readable medium that overcomes one or more of the limitations or shortcomings associated with the prior art. It may be advantageous to provide a system, method and computer readable medium which facilitates the determination of item weight for items in a non-singulated and/or non-spaced arrangement. The ability to measure individual item weight for items in a non-singulated and/or non-spaced arrangement may help to increase the revenue associated with the conveyed items as: (i) there might then be no requirement for the costly manipulation of items, by manual or automated means, into a singulated and/or spaced arrangement; and (ii) the accuracy of customer-declared weight for each of the items may be audited.

It may be an object of one aspect of the present invention to determine the weight of an item.

It may be an object of one aspect of the present invention to determine the weight of an individual item included amongst a group of items (i.e., an item in a mass flow environment).

It may be an object of one aspect of the present invention to determine the individual weight for items regardless of their arrangement (i.e., singulated, non-singulated, spaced, and/or non-spaced).

It may also be an object of one aspect of the present invention to physically store, on a computer readable medium, instructions for execution by one or more processors to implement such a system and/or method.

It may be an object of one aspect of the present invention to provide a system, method and/or computer readable medium adapted for determining the arrangement of items in a mass flow environment relative to other items.

It may be an object of one aspect of the present invention to provide a system, method and/or computer readable medium to facilitate the generation of revenue on an item weight-adjusted basis.

It may be an object of one aspect of the present invention to provide a system, method and/or computer readable medium to facilitate the attribution of dimensions and weights for individual items in a singulated, non-singulated, spaced, and/or non-spaced arrangement.

It may be an object of one aspect of the present invention to provide a system, method and/or computer readable medium adapted for use in parcel delivery and/or postal applications to facilitate the movement of freight, and/or for use in association with the manufacture of items.

It is an object of the present invention to obviate or mitigate one or more of the aforementioned disadvantages and/or shortcomings associated with the prior art, to provide one of the aforementioned needs or advantages, and/or to achieve one or more of the aforementioned objectives of the invention.

SUMMARY OF THE INVENTION

According to the invention, there is disclosed a weight determining system for use with a singulated, non-singulated, spaced, and/or non-spaced arrangement of items on a conveyor. The system includes an array of load cells, a scanning apparatus, and one or more processors. The array is associated with the conveyor and configured to have each of the items bear upon one or more of the load cells. Each of the load cells is configured to: (i) bear one or more of the items; and (ii) generate load data associated with the aforesaid one or more of the items. The scanning apparatus is configured to generate scan data corresponding to the arrangement of the items on the conveyor. The processors are encoded to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

According to an aspect of one preferred embodiment of the invention, the processors are preferably, but not necessarily, further encoded to, based on the scan data: determine when one of the items bears upon two or more of the load cells; and/or then collect and/or allocate the load data, from the aforesaid two or more of the load cells, to the aforesaid one of the items.

According to an aspect of one preferred embodiment of the invention, the processors are preferably, but not necessarily, further encoded to, based on the scan data: determine when one of the load cells bears two or more of the items; and/or then collect and/or apportion the load data, from the aforesaid one of the load cells, to the aforesaid two or more of the items.

According to an aspect of one preferred embodiment of the invention, the system may preferably, but need not necessarily, also include one or more databases to store the load data, the scan data, and/or the weight for the aforesaid each of the items.

According to an aspect of one preferred embodiment of the invention, the scanning apparatus may preferably, but need not necessarily, include a speed determining device configured to determine a speed of the conveyor. Preferably, when the load data is generated at a different time than the scan data, the processors may, but need not necessarily, be further encoded to: generate speed data corresponding to the speed of the conveyor; and/or based on the speed data, apportion and/or allocate the load data as aforesaid.

According to an aspect of one preferred embodiment of the invention, the processors may preferably, but need not necessarily, be further encoded to, based on the scan data and/or the speed data, determine the locations of the items in the arrangement relative to the aforesaid one or more of the load cells of the array.

According to an aspect of one preferred embodiment of the invention, the processors may preferably, but need not necessarily, be further encoded to, based on the locations of the items, determine the aforesaid one or more of the load cells from which the load data is to be collected for the aforesaid each of the items.

According to an aspect of one preferred embodiment of the invention, the scanning apparatus may preferably, but need not necessarily, be further configured to read a unique identification tag associated with the aforesaid each of the items. The processors may preferably, but need not necessarily, be further encoded to associate the unique identification tag with the weight for the aforesaid each of the items.

According to an aspect of one preferred embodiment of the invention, the processors may preferably, but need not necessarily, be further encoded to generate an alert for presentation to a user, preferably when the weight differs from predetermined weight data associated with the unique identification tag.

According to an aspect of one preferred embodiment of the invention, the processors may preferably, but need not necessarily, be further encoded to, based on the scan data, determine dimension data for the aforesaid each of the items.

According to an aspect of one preferred embodiment of the invention, on a plan view of the array, the load cells may preferably, but need not necessarily, be arranged in a brick-like pattern. The load cells may preferably, but need not necessarily, be configured such that, as the conveyer bears the aforesaid each of the items over the array, the load data is allocated to the aforesaid each of the items, as aforesaid, from an increased number of sets of the load cells than would be achieved if, on a plan view of the array, the load cells were arranged in a notional grid-like pattern.

According to an aspect of one preferred embodiment of the invention, as the conveyer bears the aforesaid each of the items over the array, the weight for the aforesaid each of the items may preferably, but need not necessarily, be determined two or more times.

According to an aspect of one preferred embodiment of the invention, the array may preferably, but need not necessarily, be configured, relative to the items, such that the aforesaid each of the items bears upon a first set of the load cells and/or later, as the conveyer bears the aforesaid each of the items over the array, upon a second set of the load cells disjoint from the first set.

According to an aspect of one preferred embodiment of the invention, a size of the aforesaid each of the load cells may preferably, but need not necessarily, be predetermined based on a size of the items.

According to an aspect of one preferred embodiment of the invention, the weight may preferably, but need not necessarily, be used for recovery of costs associated with the items on the conveyer.

According to the invention, there is also disclosed a weight determining method for use with a singulated, non-singulated, spaced, and/or non-spaced arrangement of items on a conveyor. The method includes step (a), step (b), and step (c). In step (a), each of the items is conveyed to bear upon one or more load cells in an array. Each of the load cells: (i) bears one or more of the items; and (ii) generates load data associated with the aforesaid one or more of the items. In step (b), a scanning apparatus is used to generate scan data corresponding to the arrangement of the items on the conveyor. In step (c), one or more processors are used to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

According to an aspect of one preferred embodiment of the invention, in step (c), the processors may preferably, but need not necessarily, be further used to, based on the scan data: determine when one of the items bears upon two or more of the load cells; and/or then collect and/or allocate the load data, from the aforesaid two or more of the load cells, to the aforesaid one of the items.

According to an aspect of one preferred embodiment of the invention, in step (c), the processors may preferably, but need not necessarily, be further used to, based on the scan data: determine when one of the load cells bears two or more of the items; and/or then collect and/or apportion the load data, from the aforesaid one of the load cells, to the aforesaid two or more of the items.

According to an aspect of one preferred embodiment of the invention, the method may preferably, but need not necessarily, also include a step of using one or more databases to store the load data, the scan data, and/or the weight for the aforesaid each of the items.

According to an aspect of one preferred embodiment of the invention, in step (b), a speed determining device of the scanning apparatus may preferably, but need not necessarily, determine a speed of the conveyor. In step (c), preferably when step (a) is performed at a different time than step (b), the processors may preferably, but need not necessarily, be further used to: generate speed data corresponding to the speed of the conveyor; and/or based on the speed data, apportion and/or allocate the load data as aforesaid.

According to an aspect of one preferred embodiment of the invention, in step (c), the processors may preferably, but need not necessarily, be further used to, based on the scan data and the speed data, determine the locations of the items in the arrangement relative to the aforesaid one or more of the load cells of the array.

According to an aspect of one preferred embodiment of the invention, in step (c), the processors may preferably, but need not necessarily, be further used to, based on the locations of the items, determine the aforesaid one or more of the load cells from which the load data is to be collected for the aforesaid each of the items.

According to an aspect of one preferred embodiment of the invention, in step (b), the scanning apparatus may preferably, but need not necessarily, be further used to read a unique identification tag associated with the aforesaid each of the items. In step (c), the processors may preferably, but need not necessarily, be further used to associate the unique identification tag with the weight for the aforesaid each of the items.

According to an aspect of one preferred embodiment of the invention, in step (c), the processors may preferably, but need not necessarily, be further used to generate an alert for presentation to a user, preferably when the weight differs from predetermined weight data associated with the unique identification tag.

According to an aspect of one preferred embodiment of the invention, in step (c), the processors may preferably, but need not necessarily, be further used to, based on the scan data, determine dimension data for the aforesaid each of the items.

According to an aspect of one preferred embodiment of the invention, before steps (a) through (c), the load cells may preferably, but need not necessarily, be arranged, on a plan view of the array, in a brick-like pattern.

According to an aspect of one preferred embodiment of the invention, as the conveyer bears the aforesaid each of the items over the array, the weight for the aforesaid each of the items may preferably, but need not necessarily, be determined two or more times.

According to an aspect of one preferred embodiment of the invention, before steps (a) through (c), the array may preferably, but need not necessarily, be configured, relative to the items, such that the aforesaid each of the items bears upon a first set of the load cells and/or later, as the conveyer bears the aforesaid each of the items over the array, upon a second set of the load cells disjoint from the first set.

According to an aspect of one preferred embodiment of the invention, before steps (a) through (c), a size of the aforesaid each of the load cells may preferably, but need not necessarily, be determined based on a size of the items.

According to an aspect of one preferred embodiment of the invention, the method may preferably, but need not necessarily, also include a step of using the weight for recovery of costs associated with the items on the conveyer.

According to the invention, there is also disclosed a computer readable medium. The computer readable medium is for use with: a singulated, non-singulated, spaced, and/or non-spaced arrangement of items on a conveyor; an array of load cells associated with the conveyor, with the array configured to have each of the items bear upon one or more of the load cells, and with each of the load cells configured to bear one or more of the items and generate load data associated with the aforesaid one or more of the items; and a scanning apparatus which generates scan data corresponding to the arrangement of the items on the conveyor. The computer readable medium includes executable instructions which are physically stored thereon and which, upon execution, encode one or more processors to: collect the load data and the scan data; and based on the scan data (i) apportion the load data, from the aforesaid each of the load cells, to the aforesaid one or more of the items, (ii) allocate the load data, apportioned as aforesaid, to the aforesaid each of the items from the aforesaid one or more of the load cells, and (iii) determine a weight for the aforesaid each of the items in the arrangement based on the load data apportioned and allocated as aforesaid.

Other advantages, features and characteristics of the present invention, as well as methods of operation and functions of the related elements of the system, method, and computer readable medium, and the combination of steps, parts and economies of manufacture, will become more apparent upon consideration of the following detailed description and the appended claims with reference to the accompanying drawings, the latter of which are briefly described hereinbelow.

BRIEF DESCRIPTION OF THE DRAWINGS

The novel features which are believed to be characteristic of the system, method and computer readable medium according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings:

FIGS. 7A, 7B, 7C and 7D are top plan views of the load cell array of FIG. 6, together showing the progress of a non-singulated and non-spaced arrangement of items being conveyed thereover;

FIG. 8 is a schematic diagram depicting the apportionment and allocation of load data from two load cells according to one preferred embodiment of the invention.

DETAILED DESCRIPTION OF THE PREFERRED EMBODIMENTS

Figure 1A:
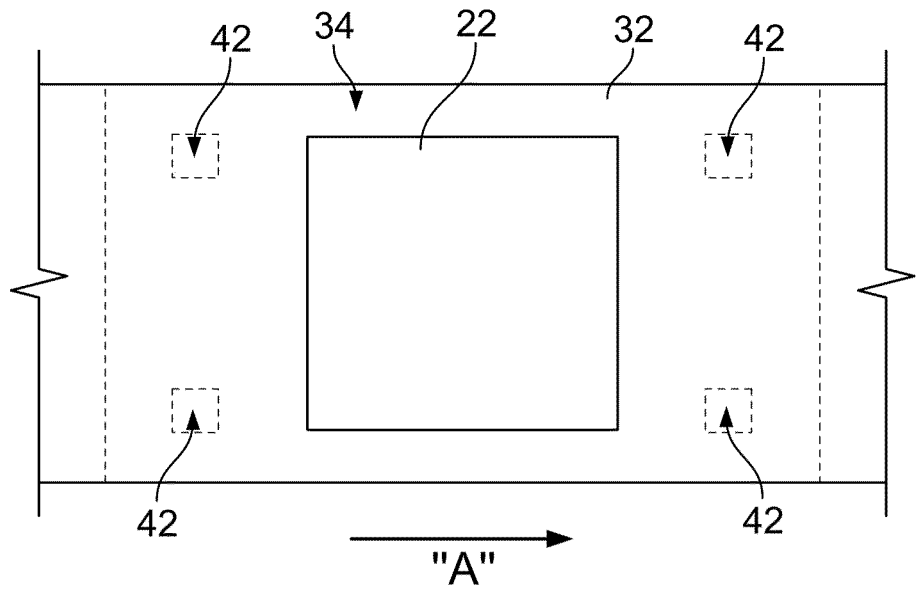
FIGS. 1A and 1B are plan and side views, respectively, of a prior art weight determining system.
Figure 1B:
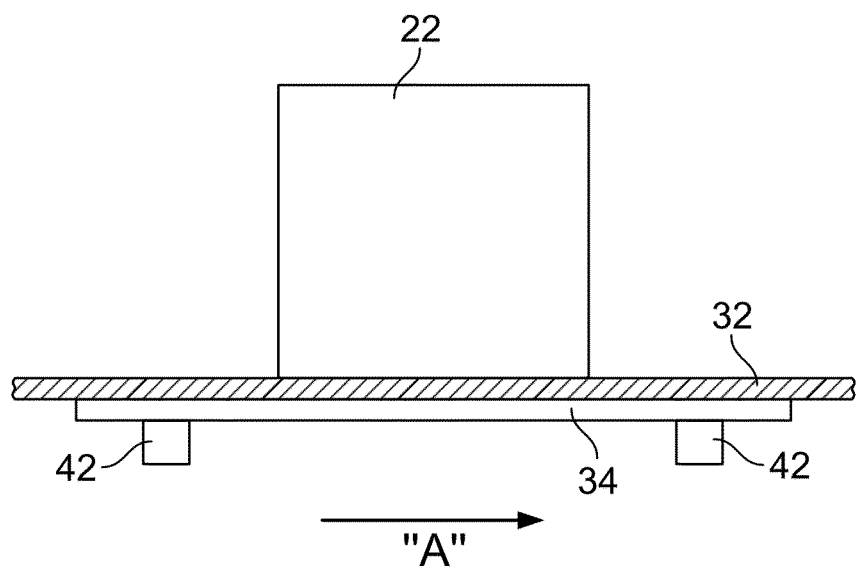

Referring to FIGS. 1A and 1B, there are shown plan and side views of a conveyor belt 32 bearing an item 22 in a downstream direction "A". The conveyor belt 32 moves the item 22 across a conveyor bed 34. FIGS. 1A and 1B, show a prior art scale which has four load cells 42 positioned at the corners of the conveyor bed 34. This arrangement of the prior art load cells 42 may have calculated the weight of the item 22 by summing and/or averaging the weight determinations from each of the prior art load cells 42.

Figure 2:
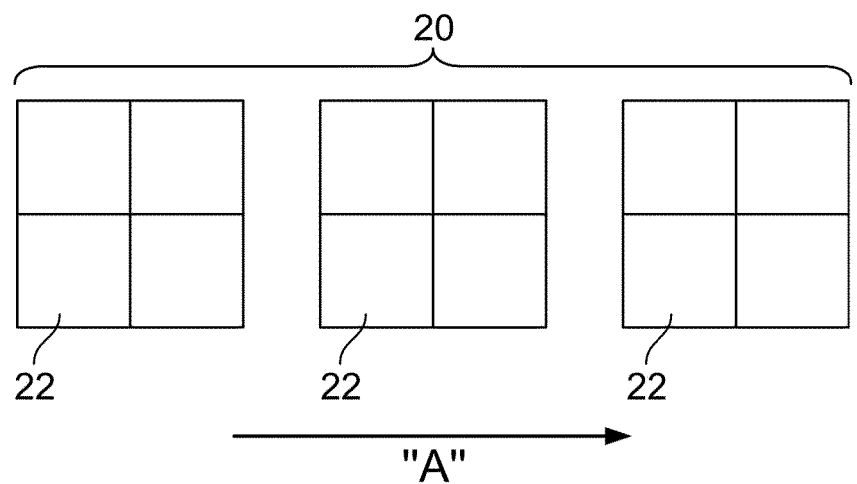
FIG. 2 is a plan view of items having a singulated and spaced arrangement relative to a conveyor direction "A"

Referring to FIG. 2, there is depicted an example of items (alternately, herein, "packages" or "parcels") 22, moving in the downstream direction "A", which have a singulated and spaced arrangement 20.

Figure 3:
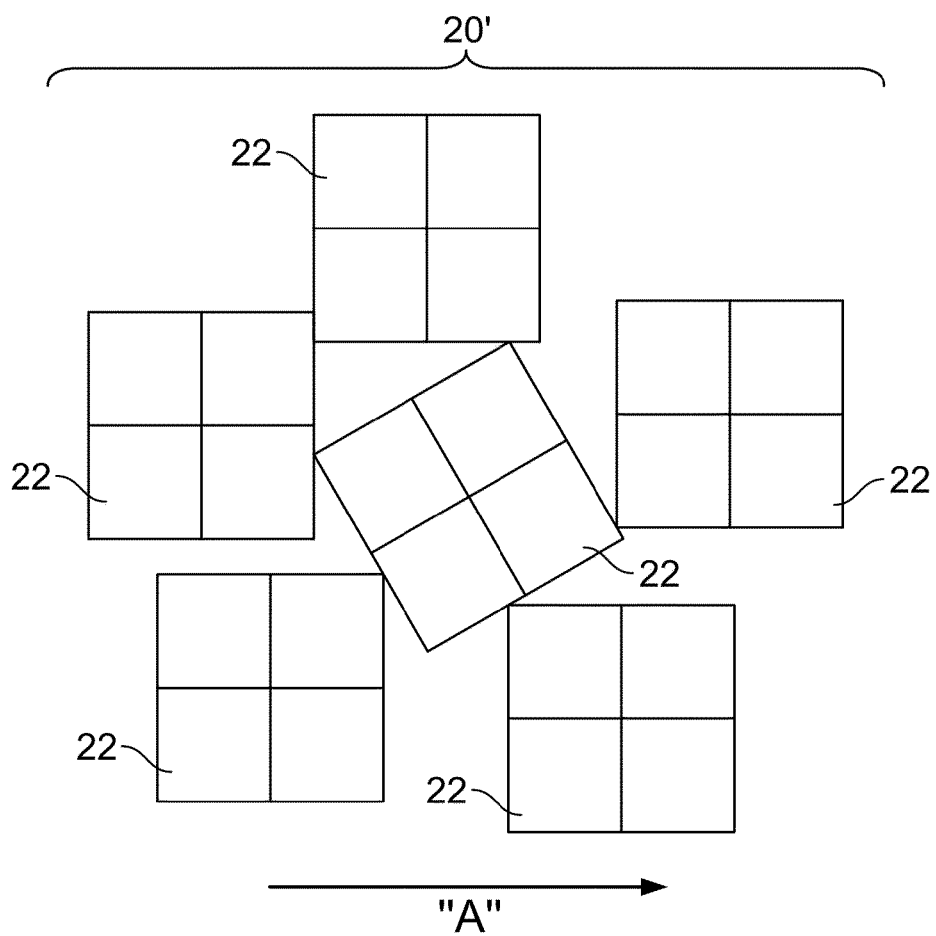
FIG. 3 is a plan view of items having a non-singulated and non-spaced arrangement relative to the conveyor direction "A"

Referring to FIG. 3, there is depicted another example of items 22 moving in the downstream direction "A", this time having a non-singulated and non-spaced arrangement 20'. (FIGS. 4 and 7A to 9 also depict the non-singulated and non-spaced arrangement 20'.)

Figure 4:
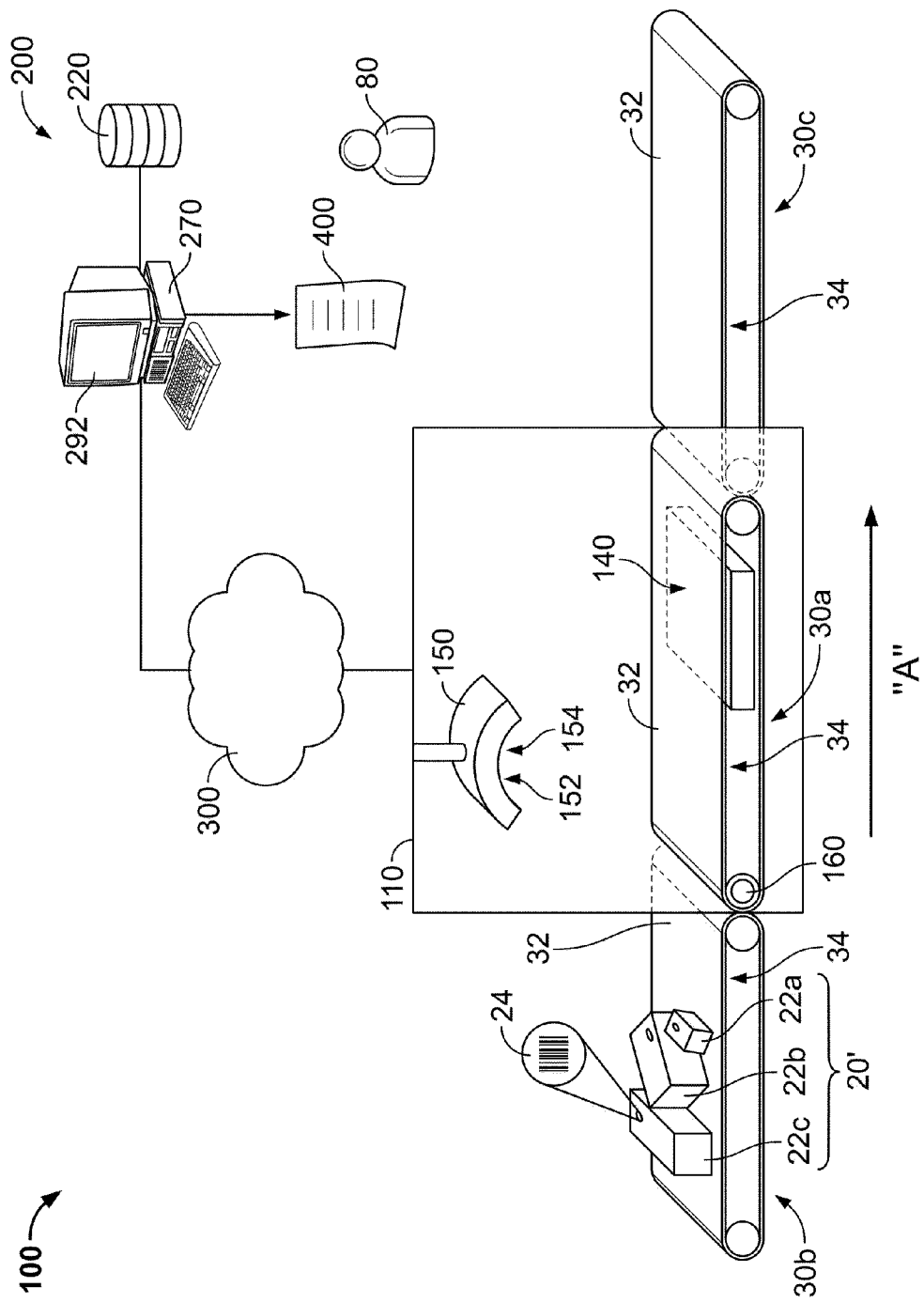
FIG. 4 is a schematic diagram of a weight determining system according to one preferred embodiment of the invention, shown in use with a non-singulated and non-spaced arrangement of items on a conveyor.

Referring to FIG. 4, there is shown a system 100 for determining the weight of items 22a, 22b, 22c in the non-singulated and non-spaced arrangement 20' on a conveyor 30a. [Herein, the items 22a, 22b, 22c or any one or more of them may be generally referred to as the items 22 or, individually, as the item 22.] The system 100 may be used within a single facility and/or multiple facilities. For example, some of the components of the system 100 may be provided at a remote location.

In view of FIG. 4, skilled persons may appreciate that each of the items 22 has a unique identification tag 24, preferably a barcode, affixed thereto. The items 22 in the non-singulated and non-spaced arrangement 20' are transported in the downstream direction "A" by a series of conveyors 30b, 30a, 30c. The items 22 may be freight or other items moving within a mail system, a distribution system generally, or a manufacturing facility. Each of the conveyors 30a, 30b, 30c preferably includes a conveyor belt 32 and conveyor bed 34 to facilitate and support the transit of the items 22.

Figure 5:
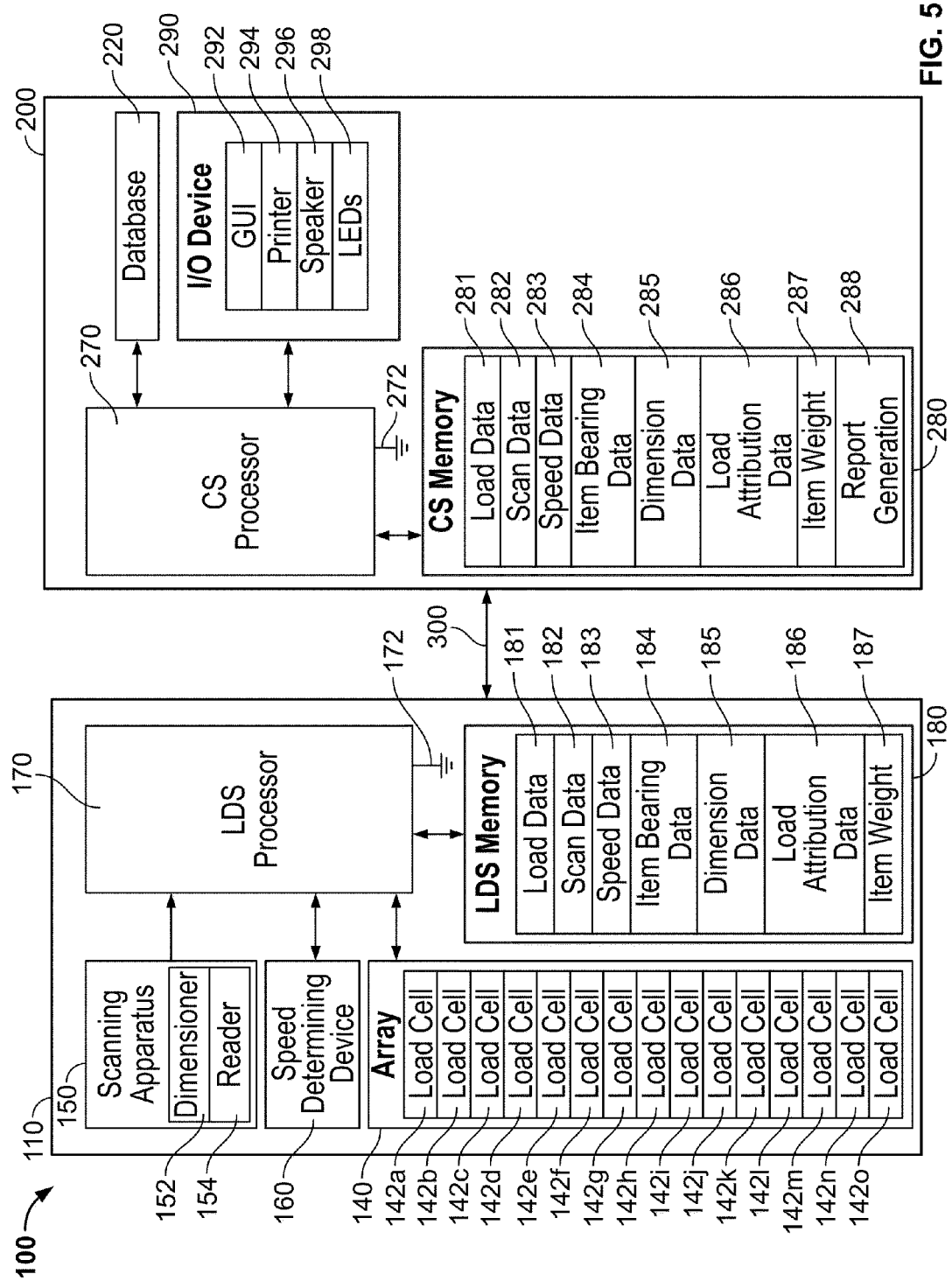
FIG. 5 is a schematic diagram of components of the system of FIG. 4.

Preferably, and as best seen in FIGS. 4 and 5, the system 100 includes a load determining subsystem (alternately, the "LDS") 110 and a courier subsystem (alternately, the "CS") 200. The load determining subsystem 110 preferably includes a scanning apparatus 150 and a load cell array 140. The scanning apparatus 150 preferably scans the location of the items 22 on the conveyor 30a, and also includes a dimensioner 152 and a reader 154. The dimensioner 152 is for determining the dimensions of each of the items 22 on the conveyor 30a. The reader 154 automatically reads the unique identification tags 24 from the items 22. The reader 154 is preferably a barcode scanner, but can be an imager, or a laser-based reader. [The reader 154 may instead be a radio-frequency identification ("RFID") reader. When an RFID reader is provided, one or more of the identification tags 24 on the items 22 are RFID tags.] In some preferable embodiments, and as shown in FIGS. 4 and 5, the load determining subsystem 110 may also include a speed determining device 160.

As further shown in FIGS. 4 and 5, the system 100 is adapted for use with a communication network 300. The communication network 300 may include satellite networks, terrestrial wired or wireless networks, and/or the Internet. The communication of data between the load determining subsystem 110 and the courier subsystem 200 may be also achieved via physical means (e.g., a flash drive) of transmission. From the teachings and disclosures herein, persons having ordinary skill in the art may appreciate that the system 100 preferably includes hardware and software.

The courier subsystem 200 preferably includes a CS processor 270, a graphical user interface ("GUI") 292, and a database 220. As may be best appreciated by a consideration of FIGS. 4 and 5, the database 220 may preferably be located remotely from the load determining subsystem 110. Reports 400 (e.g., invoices) generated by the CS processor 270 may be viewed by a user 80 via the GUI 292, in printed form, or otherwise.

In FIG. 5, and among other things, the load determining subsystem 110 is schematically illustrated as including the scanning apparatus 150 (with its dimensioner 152 and reader 154), the array 140, the speed determining device 160, an LDS processor 170, and a LDS computer readable medium (alternately referred to as "LDS processor-readable memory" or "LDS memory") 180. The array 140 is shown to include a plurality of load cells 142a-o.

The courier subsystem 200 includes the CS processor 270, the database 220, and a CS computer readable medium (alternately referred to as "CS processor-readable memory" or "CS memory") 280. The courier subsystem 200 is shown to further include various input-output (alternately "I/O") devices 290 such as the GUI 292, a printer 294, a speaker 296, and light emitting diodes (alternately "LEDs") 298 associated with the courier subsystem 200.

The GUI 292 may include a touchscreen (and the two terms may be used interchangeably herein), a display with or without a "point-and-click" mouse or other input device. The GUI 292 enables (selective or automatic) display of any data (as described below) determined by the processors 170, 270— whether received directly therefrom and/or retrieved from the database 220—as well as display and input of other information associated with the items 22.

Preferably, the processors 170, 270 are operatively encoded with one or more algorithms stored in the LDS memory 180 and/or CS memory 280 to provide load data logic, scan data logic, speed data logic, item bearing data logic, dimension data logic, load attribution data logic, item weight logic, and/or report generation logic 288. Preferably, the algorithms enable the processors 170, 270 to determine the arrangement 20' of the items 22 on the conveyor 30a, and ultimately the weight of each of the items 22. (As described elsewhere herein, the LDS memory 180 and CS memory 280 preferably also store load data 181, 281, scan data 182, 282, speed data 183, 283, item bearing data 184, 284, dimension data 185, 285, load attribution data 186, 286 and item weight data 187, 287.) The LDS processor 170 and/or the CS processor 270 are also preferably operatively connected to one or more power sources 172, 272.

Using the communication network 300, the LDS processor 170 may be wired to communicate, or may wirelessly communicate (for example, by the Bluetooth™ proprietary open wireless technology standard which is managed by the Bluetooth Special Interest Group of Kirkland, Wash.) with the CS processor 270.

Figure 6:
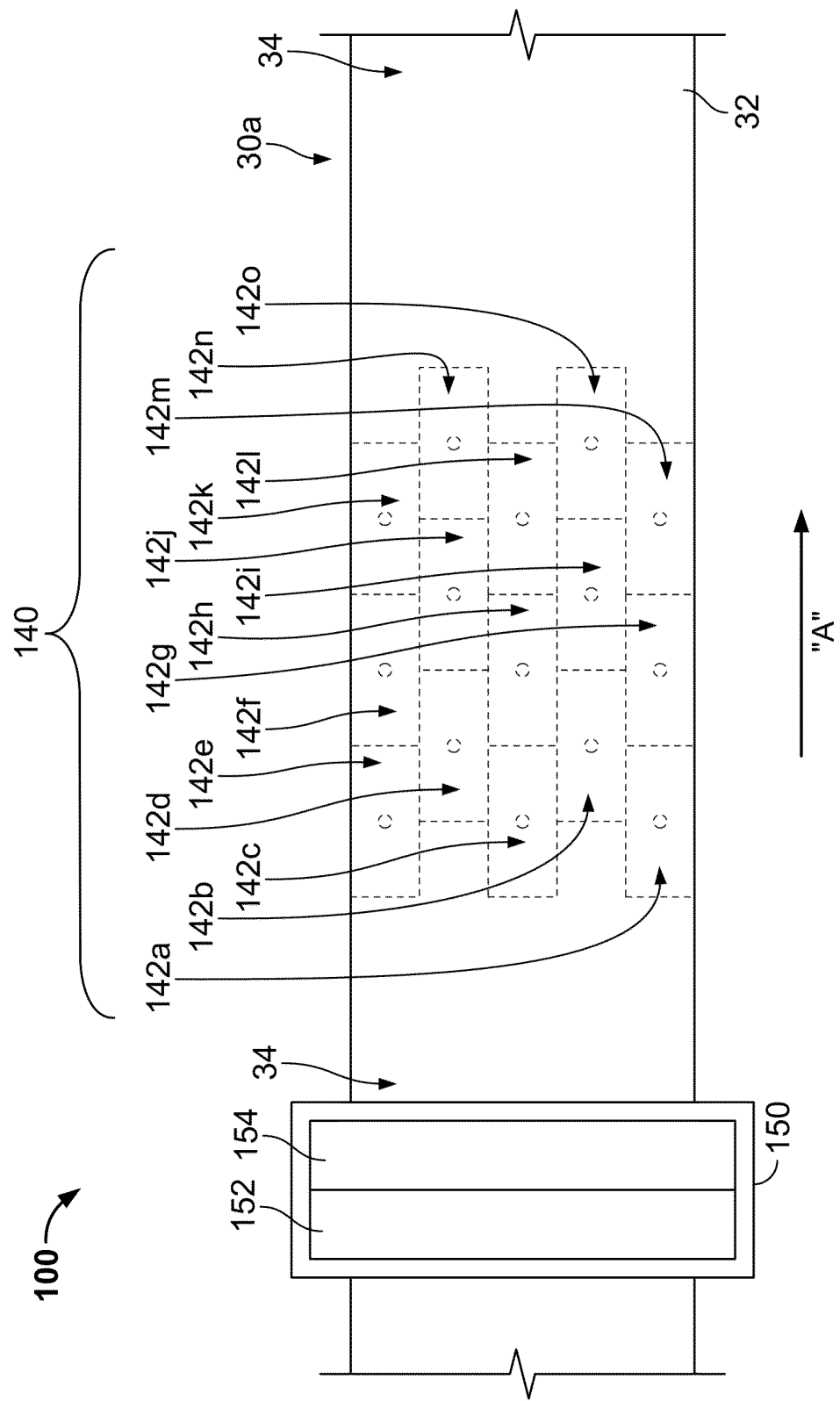
FIG. 6 is a top plan view of a scanning apparatus and load cell array of the system shown in FIG. 4.

Referring to FIG. 6, the array 140 may preferably be positioned downstream (with reference to the downstream direction "A") from the scanning apparatus 150 and beneath the conveyor belt 32 of the conveyor 30a. [Alternately, the array 140 might be aligned underneath the conveyor belt 32 and the scanning apparatus 150.]

As described elsewhere herein, the scan data 182, 282 and/or the dimension data 185, 285 may be used to track the items 22 as they move in the downstream direction "A" along the conveyor 30a. Preferably, depending on the size of the items 22, the items 22 may be tracked for a distance of about twelve (12) feet in the downstream "A" from the scanning apparatus 150 to accommodate arrays 140 of various sizes and to provide for substantially concurrent generation of scan data 182, 282 and load data 181, 281 for the items 22.

Figure 7A:
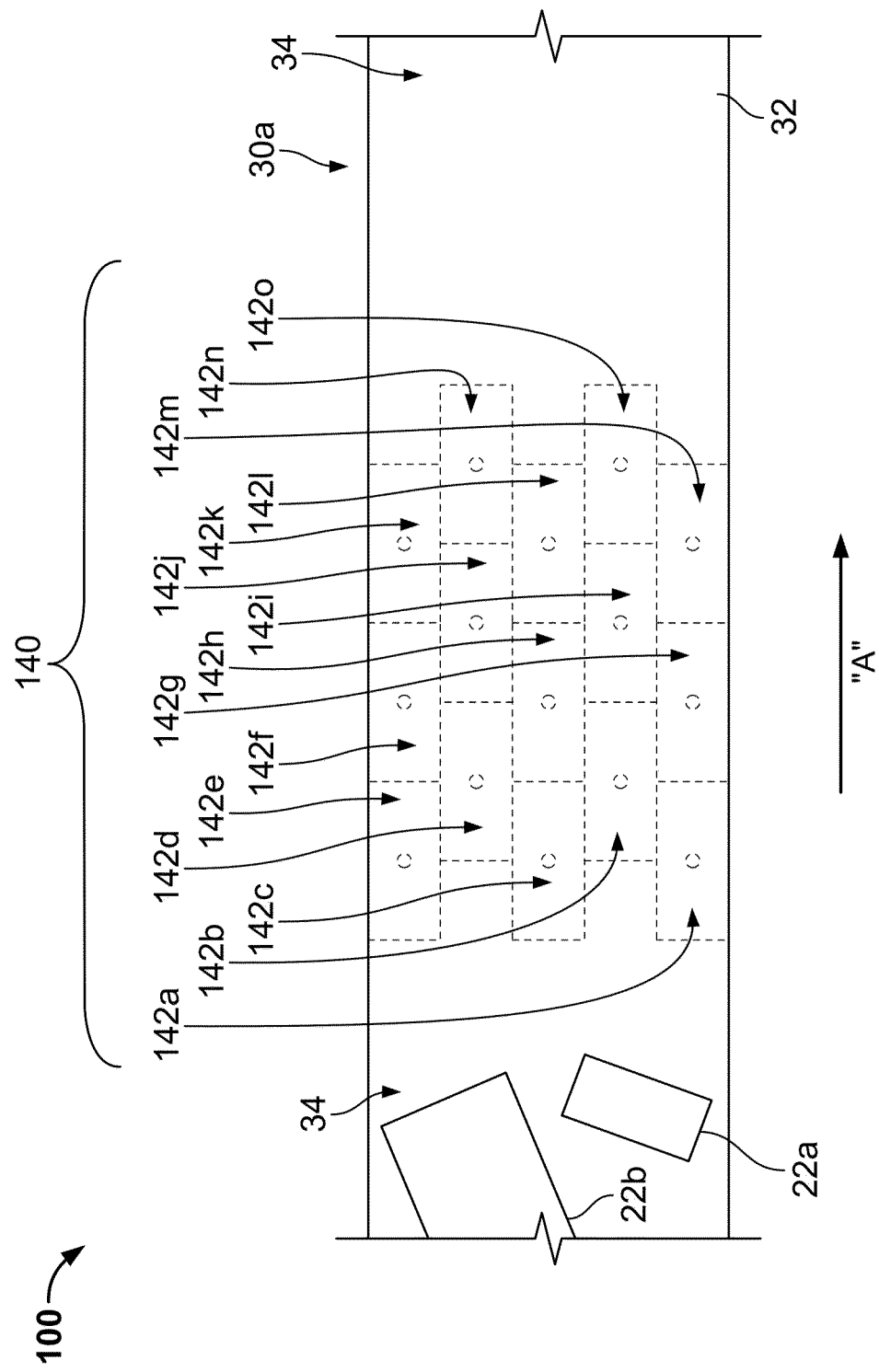
Figure 7B:
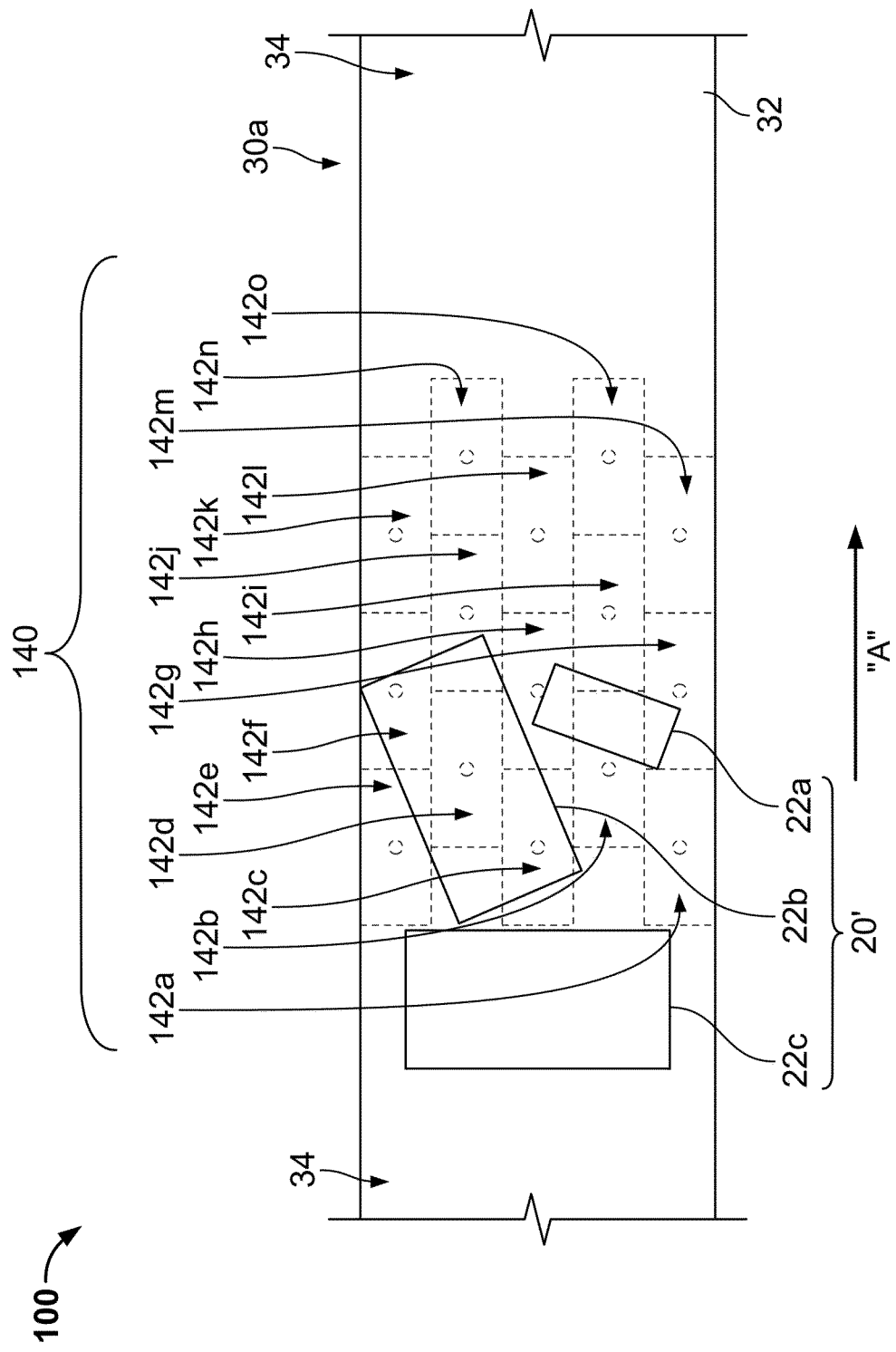
Figure 7D:
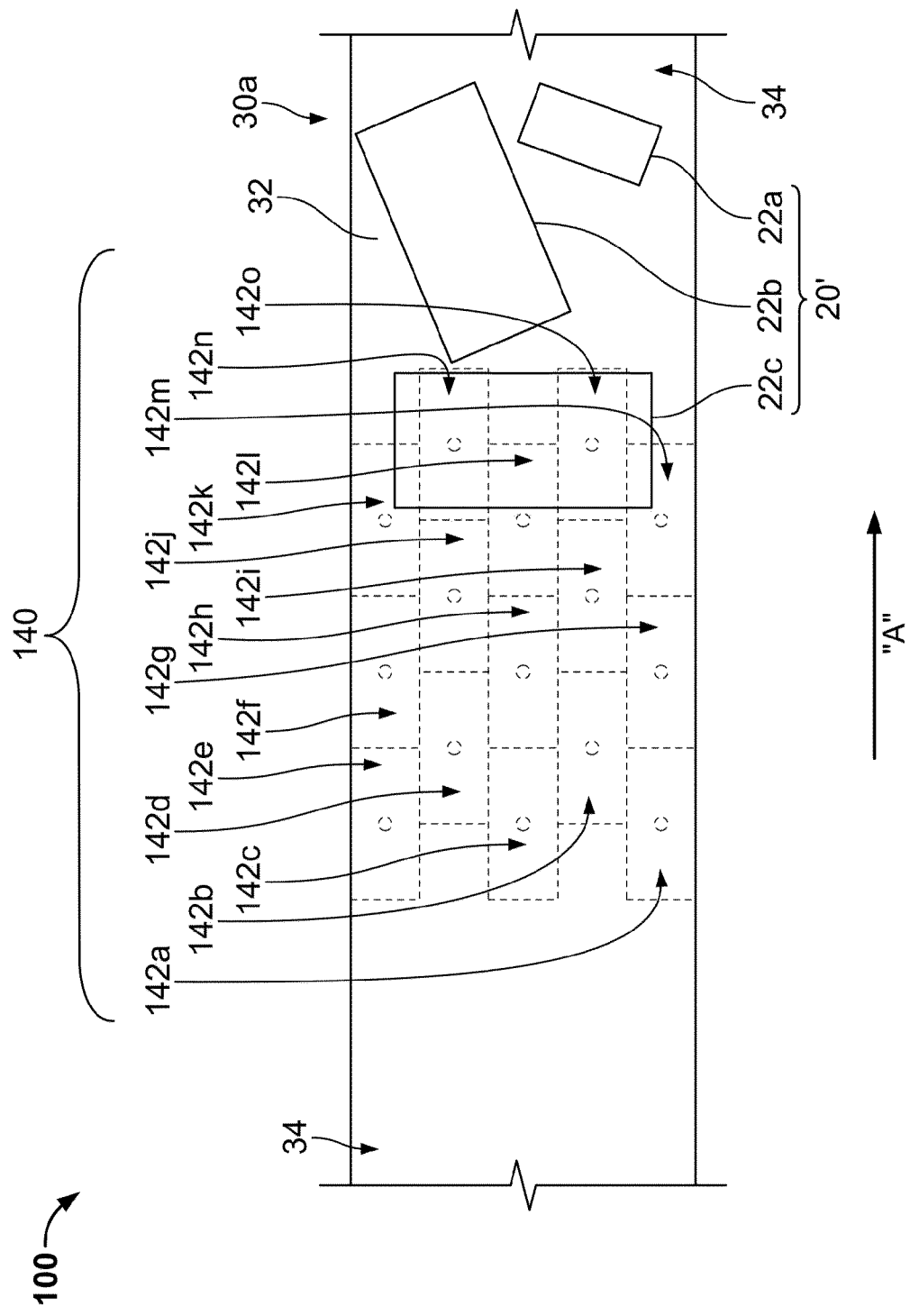

As best seen in FIG. 6 through 7D, the array 140 preferably includes multiple load cells 142a, 142b, 142c, 142d, 142e, 142f, 142g, 142h, 142i, 142j, 142k, 142l, 142m, 142n, 142o arranged in a brick-like pattern. In comparison to a more straight-forward grid-like pattern, each of the load cells 142a-o in the brick-like pattern is offset, in the downstream direction "A", relative from each of its laterally adjacent, neighboring load cells 142a-o. As aforesaid, the conveyor 30a includes the conveyor belt 32 and its underlying conveyor bed 34 (as best seen in FIG. 9).

Referring to FIGS. 7A-D, the load cells 142a-o of the array 140 are shown in the aforesaid brick-like pattern. The items 22a, 22b, 22c are shown in the non-singulated and non-spaced arrangement 20'. The conveyor belt 32 and conveyor bed 34 of the conveyor 30a bear this arrangement 20' of the items 22a, 22b, 22c in the downstream direction "A".

In FIG. 8, the items 22a, 22b, 22c are schematically shown moving in the downstream direction "A" over adjacent load cells 142l, 142h (from FIG. 7C). Item 22a is shown bearing upon load cell 142l. Item 22b is shown bearing upon load cells 142l, 142h. And, item 22c is shown bearing upon load cell 142h. Load cell data 181 from load cell 142l is shown apportioned into load cell data 181, 181 and as between items 22a, 22b. Load cell data 181 from load cell 142h is shown apportioned into load cell data 181, 181 and as between items 22b, 22c. Load cell data 181 from load cell 142l is allocated to item 22a. Load cell data 181, 181 from load cells 142l and 142h is allocated to item 22b. Load cell data 181 from load cell 142h is allocated to item 22c.

Figure 9:
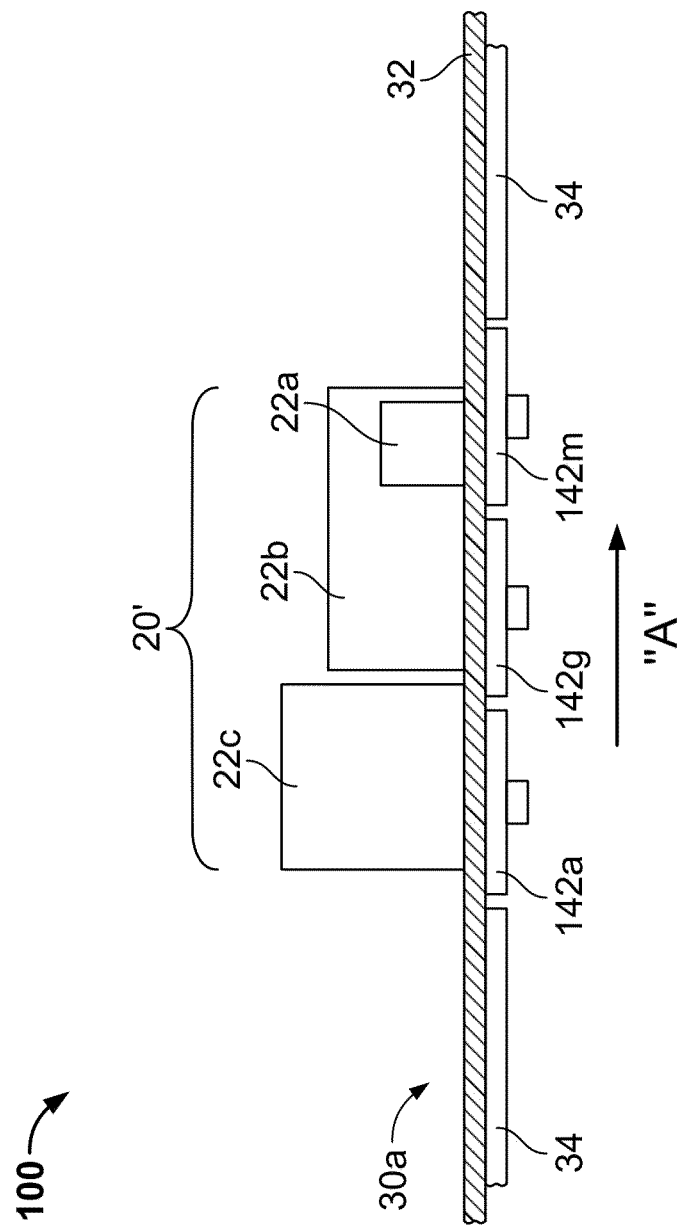
FIG. 9 is a right side view of load cells in the array of FIG. 7C.

Referring to FIG. 9, there is shown a schematic side view of FIG. 7C. The non-singulated and non-spaced arrangement 20' of the items 22a, 22b, 22c bears upon the conveyor belt 32 of the conveyor 30a and, indirectly, upon load cells 142a-o. Only load cells 142a, 142g and 142m are visible in this view. As may be best appreciated from FIG. 9, each of the load cells 142a-o may preferably be spaced from its adjacent neighboring load cells 142a-o by a small gap. The gap may preferably be sized so as to permit, and not interfere with, substantially accurate weight measurements.

In use, as best shown in FIGS. 4 and 5, items 22 are received by the conveyor 30a of the load determining subsystem 110. The scanning apparatus 150 preferably generates scan data 182, 282 concerning the arrangement 20' of the items 22 on the conveyor 30a, including their locations. The arrangement 20' of the items 22 may preferably be determined to a level of accuracy within about ⅛ of an inch. The dimensioner 152 collects dimension data 185, 285 (e.g., x-coordinates and/or width, y-coordinates and/or length, z-coordinates and/or height relative to the conveyor 30a) for each of the items 22. The dimension data 185, 285 may be based on the scan data 182, 282. The reader 154 reads information (e.g., a barcode) from each of the items 22, which may subsequently be associated with the corresponding items 22 by the processors 170, 270 in the LDS memory 180, the CS memory 280 and/or the database 220. In some preferred embodiments of the invention, the processors 170, 270 may use the dimension data 185, 285 to determine the center of each of the items 22.

Substantially contemporaneous with generating the scan data 182, 282, the load cells 142a-o generate the load data 181, 281 as a measure of the extent to which each is loaded by the items 22 on the conveyor 30a. The scan data 182, 282 and the load data 181, 281 are collected by the processors 170, 270.

Preferably, each of the load cells 142a-o, alone or in combination with one or more others, collects the load data 181, 281. As aforesaid, the load data 181, 281 is associated with one or more of the items 22 bearing on the load cells 142a-o as they are conveyed across the array 140.

As the conveyor bears the items 22 over the array 140, the brick-like pattern is such that the load cells 142a-o are configured for load data 181, 281 to be allocated to each of the items 22 (as discussed in greater detail below) from more sets of load cells 142a-o—i.e., relative how many different sets might contribute such data were the load cells 142a-o notionally arranged in a grid-like pattern. In other words, if the load cells 142a-o were arranged in grid-like pattern, there would be fewer opportunities for each of the items 22 to bear upon a different combination or set of load cells 142a-o, and each of the load cells 142a-o thus to contribute load data 181, 281 in a different context. As it is, the brick-like pattern of the load cells 142a-o may be appreciated to encourage the staged transit of the items 22 over the array 140 and/or to increase or maximize the number of opportunities for each of the items 22 to be associated with load data 181, 281 generated by different combinations or sets of the load cells 142a-o. An increase in the number of sets of load cells 142a-o that bear each of the items 22, in their transit across the array 140, preferably results in more opportunities for successive determinations of the item weight 187, 287 and/or for more accurate determinations of the item weight 187, 287.

The determination of the item weight 187, 287 by the system 100, for items 22 having the non-singulated and non-spaced arrangement 20', may be best understood with reference to FIGS. 7A through 7D. In FIGS. 7A through 7D, the items 22a, 22b, 22c travel in the downstream direction "A" relative to the array 140.

In FIG. 7A, items 22a and 22b approach the array 140, and the conveyor bed 34 underneath the belt 32 bears the load associated with them. At this stage, any load data 181, 281 generated by the load cells 142a-o is not apportioned, allocated, or attributable to items 22a and 22b (nor to item 22c, not shown).

In FIG. 7B, items 22a, 22b and (now item) 22c are shown as having been advanced by the conveyor 30a further in the downstream direction "A". At this stage, item 22a bears upon load cells 142b, 142g, 142h and 142i. Item 22b bears upon load cells 142c, 142d, 142e, 142f, 142h and 142j and upon the conveyor bed 34. And, item 22c has not yet advanced to the array 140 and is still bearing on the conveyor bed 34.

In FIG. 7C, items 22a, 22b and 22c are shown as having been still further advanced by the conveyor 30a in the downstream direction "A". At this stage, item 22a bears upon load cells 142i, 142l, 142m and 142o. Item 22b bears upon load cells 142b, 142d, 142f, 142h, 142i, 142j, 142k, 142l and 142n. And, item 22c bears upon load cells 142a, 142b, 142c, 142d, 142e, 142f, 142g and 142h and upon the conveyor bed 34. Notably, different combinations of load cells 142a-o are bearing item 22a in FIGS. 7B and 7C, and the same is true for item 22b.

In FIG. 7D, the items 22a, 22b, 22c have been advanced yet further by the conveyor 30a in the downstream direction "A". Items 22a and 22b are no longer bearing upon any of the load cells 142a-o. At this stage, item 22c bears upon load cells 142k, 142l, 142m, 142n and 142o and upon the conveyor bed 34. Different combinations of load cells 142a-o are bearing item 22c in FIGS. 7C and 7D.

As each item 22 transits over the array 140, the load associated with the portion thereof which bears upon a particular load cell 142a-o may be collected and recorded as load data 181, 281. Each item 22 bears on different combinations of the load cells 142a-o at various times (represented by FIGS. 7A-D) during its transit over the array 140. Load data 181, 281 associated with each item 22 is successively generated as each is carried from one combination of load cells 142a-o to the next.

Load data 181, 281 generated by each of the load cells 142a-o is preferably apportioned and allocated to one or more of items 22a, 22b, 22c by the processors 170, 270 (with reference to the scan data 182, 282 and, preferably, the speed data 183, 283) to determine the item weights 187, 287.

By way of example, the following is a brief discussion of how, according to the invention, the item weight 187, 287 of item 22a is preferably determined at the stage depicted in FIG. 7B (i.e., and leaves aside, for now, a like discussion of the same determination for item 22b). As aforesaid, item 22a bears upon load cells 142b, 142g, 142h, and 142i in FIG. 7B and the one or more of the processors 170, 270 canvass them to obtain the load data 181, 281 therefrom. Since item 22a is the only one bearing on load cells 142b, 142g and 142i, all the load data 181, 281 from these load cells 142b, 142g and 142i is apportioned to item 22a. Not so for the load data 181, 281 from load cell 142h, which bears items 22a and 22b. In the result, only a portion of the load data 181, 281 generated by load cell 142h at that time is apportioned to item 22a (i.e., with the remainder being apportioned to item 22b). How the load data 181, 281 from load cell 142h is apportioned as between items 22a and 22b is preferably stored by the processors 170, 270 in the LDS memory 180 and the CS memory 280 as load attribution data 186, 286. The load data 181, 281 apportioned to item 22a from load cells 142b, 142g, 142h and 142i is subsequently allocated, integrated and/or summed for item 22a to determine the item weight 187, 287.

The load data 181, 281 may be similarly used to determine the item weights 187, 287 for the items 22 borne by the load cells 142a-o in FIGS. 7A through 7D.

As each item 22 transits across the array 140, varying combinations of load cells 142a-o bear the load associated with it. For example, a second item weight 187, 287 might be calculated (using a different combination of load cells 142i, 142l, 142m and 142o) for item 22a at the stage depicted in FIG. 7C. The processors 170, 270 may preferably determine an overall item weight 187, 287 for each item 22 by averaging the various item weights 187, 287 for that item 22 which were calculated (by apportioning and allocating the load data 181, 281 as aforesaid) from all the different combinations of load cells 142a-o as the item 22 completes its transit across the array 140.

The gaps between the load cells 142a-o (shown in FIG. 9) in the array 140 may preferably help to avoid contact between the load cells 142a-o, and/or the generation of false load data 181, 281. In this manner, the gaps may facilitate accurate determination of the item weights 187, 287.

The processors 170, 270 may use the scan data 182, 282 collected by the scanning apparatus 150 to determine the approximate path of each of the items 22 (i.e., item tracking) as they pass along the array 140. The items 22 are preferably tracked by the scanning apparatus 150 prior to moving onto the array 140 and/or during transit of the items 22 over the array 140. Tracking the items 22 preferably allows the processors 170, 270 to use the associated scan data 182, 282 (e.g., the x-coordinates, the y-coordinates, and/or the z-coordinates) to determine the combination of load cells 142a-o which bear (or which are most likely to bear) each item 22 at any particular time. Substantially accurate weighing of items 22 in a mass flow environment may be attainable by tracking the locations of the items 22 and/or determining the relative probability that a given load cell 142a-o may generate load data 181, 281 related to a particular item 22. In addition, the amount of time that each of the items 22 bears on specific combinations of load cells 140a-o may also be used by the processors 170, 270 to facilitate the determination of item weight 187, 287.

Persons skilled in the art may appreciate that conveyor belts 32 may typically be somewhat malleable. An item 22 carried upon the belt 32 may, by action of the belt 32, bear on load cells 142a-o which do not directly underlie that item 22. For example, in FIG. 7B, item 22a bears on load cells 142b, 142g, 142h and 142j. Depending on the malleability of the belt 32, item 22a may also be borne, by action of the belt 32, by the load cell 142a resulting in the generation of load data 181, 281 therefrom. Preferably, the conveyor belt 32 may be of a known malleability and/or the system 100 may readily enable a determination of the load cells 142a-o which bear each of the items 22 at any particular time, including any which do not directly underlie the items (i.e., the "zone of accuracy"). Preferably, the processors 170, 270 may use the scan data 182, 282, the load data 181, 281 and/or the dimension data 185, 285 to identify the zones of accuracy for each of the items 22, at any particular time, in order to obtain more accurate determinations of item weight 187, 287.

For the transit of each item 22 over the array 140, the processors 170, 270 may also assess which combinations of load cells 142a-o may be somewhat less accurate, or even least accurate (e.g., those combinations including load data 181, 281 from more load cells 142a-o not directly underlying the item 22), to determine likely inconsistencies in item weight 187, 287. This assessment and an assessment of the zones of accuracy may facilitate a better understanding of the distribution of load data 181, 281 on the load cells 142a-o from the various items 22 in transit across the array 140.

In some preferred embodiments of the invention, the system 100 may generate the load data 181, 281 after (or before) the scan data 182, 282. Preferably, the speed determining device (alternately, the "tachometer") 160 shown in FIGS. 4 and 5 may be used to generate speed data 183, 283 corresponding to a speed of the conveyor 30a and of the items 22 conveyed thereby. The speed data 183, 283 is preferably used by the processors 170, 270 to calculate the advance and location of each item 22 on the conveyor 30a at various times after (or before) generation of the scan data 182, 183 by the scanning apparatus 150. The location of each item 22 is calculated relative to the array 140 and each of the load cells 142a-o. Thus, a calculation of the scan data 182, 282 and speed data 183, 283 preferably enables a determination of which combination of load cells 142a-o bears any given item 22 at a given time. The combination of load cells 142a-o bearing a given item 22 at a given time, so determined, may be referred to herein as item bearing data 184, 284.

In some embodiments, the processors 170, 270 may also use the dimension data 185, 285 to determine, or to aid in determining, the location of each item 22 on the conveyor 30a and/or when each bears upon which of the load cells 142a-o.

The processors 170, 270 preferably generate a signal for presentation of the various data 181-187, 281-287 to the courier and/or the user 80 of the system 100. The data 181-187, 281-287 may be presented by the system 100 using one or more of the I/O devices 290. The data 181-187, 281-287 may be presented using one or more reports 400 (shown in FIG. 4) generated by the CS processor 280 encoded with report generation logic 288. Among others, the reports 400 may include weight reports, invoice reports, and/or dimension reports.

The I/O devices 290 may present the data 181-187, 281-287 in the form of an alert or otherwise. Such alerts may include visual (or audible) warning signals which may be triggered to highlight a given condition to the user 80, for example, if a difference is identified between the item weight 187, 287 which is determined for a particular item 22, according to the invention, and any predetermined and/or user-entered weight data which is associated with that item 22 via its unique identification tag 24 or otherwise.

The density, number and size of the load cells 142a-o in the array 140 are preferably predetermined based on the size of the items 22 to be conveyed and weighed. For example, if the items 22 are one foot cubes (i.e., 12"×12"×12"), the load cells 142a-o in the array 140 may be up to four times more dense (e.g., two times as dense in the 'x' dimension, and two times in the 'y' dimension) than a system 100 designed as if items 22 were two foot cubes (i.e., 24"×24"×24"). The various items 22 conveyed may be variable in size and shape. The density, number and size of the load cells 142a-o in the array 140 are preferably such as to achieve accurate item weights 187, 287 and/or such as may be associated with the highest recovery of revenue.

In a preferred embodiment, the items 22 bear upon a first set of load cells 142a-o and subsequently, as the items 22 transit in the downstream direction "A", the items 22 bear upon a second set of load cells 142a-o that are disjoint from the first set. That is, the second set of load cells does not include any load cells from the first set. In other words, the array 140 is preferably about two-times as long as the longest items 22. Advantageously, this relationship may facilitate multiple collections of load data 181, 281 for each of the items 22 from the load cells 142a-o. In other preferred embodiments, the array 140 may be about two-times as long as an average length item 22 (e.g., if not cost-effective to weigh items 22 longer than a threshold length).

In an alternate embodiment (not shown), the scanning apparatus 150 may be integral with the conveyor 30a. In such an embodiment, the scanning apparatus 150 may facilitate an accurate determination of scan data 182, 282 and dimension data 185, 285 in order to identify the combination of load cells 142a-o bearing each items 22 conveyed over the array 140.

In another embodiment, the processors 170, 270 may assess whether or not the array 140 can accurately collect, apportion and/or allocate load data 181, 281 so as to determine item weights 187, 287, for example: (i) if the items 22 are too small or close together for the individual load cells 142a-o to distinguish between them; (ii) if the items 22 are too light or heavy for the array 140; and/or (iii) if the items 22 are too large for the array 140.

According to the invention, the item weight 187, 287 for each item 22 may be inserted into, or stored as part of, a data string (for that item 22 or as part of a larger data string), preferably along with its dimension data 185, 285 and/or unique identification tag 24.

The present system 100 is preferably for use with a revenue stream (e.g., cost recovery of revenue generated through the auditing of item weight) which compares a customer's declared package weight (i.e., predetermined weight data) on a customer package manifest against a second package weight measurement (i.e., item weight 187, 287) and invoices the customer based on the higher package weight.

The database 220 includes, and is regularly updated with, the load data 181, 281, the scan data 182, 282, the speed data 183, 283, the item bearing data 184, 284, the dimension data 185, 285, the load attribution data 186, 286, and the item weight 187, 287. The system 100 may include other databases, such as, for example, a load determining subsystem database (not shown) and other front and backend databases.

The database 220 includes information associated with each of the items 22 such as the following information: user-entered data (e.g., predetermined weight data), destination information, special handling information, and/or special instruction information. Destination information may be the address information of the intended receiver for the items 22.

Special handling information may include any surcharges for conveying oversized, overweight and/or oddly shaped items 22. Special instruction information may include any specific delivery instructions of the items 22 for the courier (e.g., direction information and/or expedited, express or priority delivery requests).

All or part of the database 220 may be located behind a firewall relative to the communications networks 300. Persons having ordinary skill in the art will appreciate that references herein to the database 220 may include, as appropriate, references to: (i) a single database located at a facility (e.g., in association with a courier subsystem); and/or (ii) one or more congruent and/or distributed databases, such as, for example, also including one or more sets of congruently inter-related databases—possibly distributed across multiple facilities.

The computer readable media 180, 280, shown in FIG. 5, preferably store executable instructions which, upon execution, determine the weight of items 22, the dimensions of items 22, and generates reports 400. The executable instructions include processor instructions for the processors to, according to the invention, perform the aforesaid method and perform steps and provide functionality as otherwise described above and elsewhere herein.

Thus, the system, method, and computer readable medium operatively facilitate increasing revenue associated with the weight of items 22 which may be configured in a singulated, non-singulated, spaced, and/or non-spaced arrangement.

An alternative aspect of the present invention may relate to quality control using weight determination as a means for identifying a defect. In a mass flow environment the array 140 may be used to detect items 22 that are below a predetermined weight threshold. Items 22 that are below the predetermined weight threshold may be deemed unfit for continued processing. This aspect of the present invention may be useful, for example, in a manufacturing environment.

The system, method, and computer readable medium are preferably adapted and/or adaptable for use in parcel delivery, postal applications, and manufacturing. In parcel delivery and postal applications, the system, method, and computer readable medium are preferably adapted for transport of items 22 through facilities, for transport to trailers, for transport of parcels, and to improve or facilitate movement of freight.

Persons having ordinary skill in the art may appreciate that some embodiments of the system and/or method according to the present invention may be adapted for use with: (a) a Trak3 automated material handling solution offered by Real Time Solutions; (b) a PILAR CS5200 (or CSN210) MassFlow dimensioner offered by Mettler Toledo; and/or (c) a PowerScan 8000 Series scanner offered by Datalogic.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit and scope of the invention. It is intended the scope of the invention be limited not by this description but only by the claims forming a part hereof.

What is claimed is:

1. A weight determining system for use with singulated, non-singulated, spaced, and non-spaced arrangements of items on a conveyor system, said weight determining system comprising:

(a) an array of load cells associated with the conveyor system, wherein said array is configured to have each of the items bear upon one or more of said load cells, wherein said each of the items is in adjacent and/or neighboring relation with said one or more of said load cells, and wherein each of said load cells is configured to: (i) bear one or more of the items; and
  (ii) generate load data associated with said one or more of the items;
(b) a scanning apparatus configured to generate scan data corresponding to the arrangements of the items on the conveyor system; and
(c) one or more processors encoded to: collect said load data and said scan data; and based on said scan data:
  (i) apportion said load data, from said each of said load cells, to said one or more of the items which are in said adjacent and/or neighboring relation therewith;
  (ii) allocate said load data, apportioned as aforesaid, to said each of the items from said one or more of said load cells which are in said adjacent and/or neighboring relation therewith; and
  (iii) determine a weight for said each of the items in the arrangements based on said load data apportioned and allocated as aforesaid.

2. A weight determining system according to claim 1, wherein said processors are further encoded to, based on the scan data: determine when one of the items bears upon two or more of said load cells; and then collect and allocate said load data, from said two or more of said load cells, to said one of the items.

3. A weight determining system according to claim 1, wherein said processors are further encoded to, based on the scan data: determine when one of said load cells bears two or more of the items; and then collect and apportion said load data, from said one of said load cells, to said two or more of the items.

4. A weight determining system according to claim 1, further comprising one or more databases to store said load data, said scan data, and said weight for said each of the items.

5. A weight determining system according to claim 1, wherein said scanning apparatus comprises a speed determining device configured to determine a speed of the conveyor system; and wherein when said load data is generated at a different time than said scan data, said processors are further encoded to: generate speed data corresponding to the speed of the conveyor system; and, based on said speed data, apportion and allocate said load data as aforesaid.

6. A weight determining system according to claim 5, wherein said processors are further encoded to, based on said scan data and said speed data, determine the locations of the items in the arrangements relative to said one or more of said load cells of said array.

7. A weight determining system according to claim 6, wherein the processors are further encoded to, based on the locations of the items, determine said one or more of said load cells from which said load data is to be collected for said each of the items.

8. A weight determining system according to claim 1, wherein the scanning apparatus is further configured to read a unique identification tag associated with said each of the items; and wherein the processors are further encoded to associate said unique identification tag with said weight for said each of the items.

9. A weight determining system according to claim 8, wherein the processors are further encoded to generate an alert for presentation to a user when said weight differs from predetermined weight data associated with said unique identification tag.

10. A weight determining system according to claim 1, wherein said processors are further encoded to, based on said scan data, determine dimension data for said each of the items.

11. A weight determining system according to claim 1 wherein, on a plan view of said array, laterally adjacent ones of said load cells are longitudinally offset from one another.

12. A weight determining system according to claim 1, wherein as the conveyor system bears said each of the items over said array, said weight for said each of the items is determined two or more times.

13. A weight determining system according to claim 1, wherein said array is configured, relative to the items, such that said each of the items bears upon a first set of said load cells and later, as the conveyor system bears said each of the items over said array, upon a second set of said load cells disjoint from said first set.

14. A weight determining system according to claim 1, wherein a size of said each of said load cells is predetermined based on a size of the items.

15. A weight determining system according to claim 1, wherein the weight is used for recovery of costs associated with the items on the conveyor system.

16. A weight determining method for use with singulated, non-singulated, spaced, and non-spaced arrangements of items on a conveyor system, said method comprising the steps of:
(a) conveying each of the items to bear upon one or more load cells in an array, wherein said each of the items is in adjacent and/or neighboring relation with said one or more of said load cells, with each of said load cells: (i) bearing one or more of the items; and
(ii) generating load data associated with said one or more of the items;
(b) using a scanning apparatus to generate scan data corresponding to the arrangements of the items on the conveyor system; and
(c) using one or more processors to: collect said load data and said scan data; and based on said scan data:
(i) apportion said load data, from said each of said load cells, to said one or more of the items which are in said adjacent and/or neighboring relation therewith;
(ii) allocate said load data, apportioned as aforesaid, to said each of the items from said one or more of said load cells which are in said adjacent and/or neighboring relation therewith; and
(iii) determine a weight for said each of the items in the arrangements based on said load data apportioned and allocated as aforesaid.

17. A weight determining method according to claim 16, wherein in step (c), said processors are further used to, based on the scan data: determine when one of the items bears upon two or more of said load cells; and then collect and allocate said load data, from said two or more of said load cells, to said one of the items.

18. A weight determining method according to claim 16, wherein in step (c), said processors are further used to, based on the scan data: determine when one of said load cells bears two or more of the items; and then collect and apportion said load data, from said one of said load cells, to said two or more of the items.

19. A weight determining method according to claim 16, further comprising a step of using one or more databases to store said load data, said scan data, and said weight for said each of the items.

20. A weight determining method according to claim 16, wherein in step (b), a speed determining device of said scanning apparatus determines a speed of the conveyor system; and wherein in step (c), when step (a) is performed at a different time than step (b), said processors are further used to: generate speed data corresponding to the speed of the conveyor system; and, based on said speed data, apportion and allocate said load data as aforesaid.

21. A weight determining method according to claim 20, wherein in step (c), said processors are further used to, based on said scan data and said speed data, determine the locations of the items in the arrangements relative to said one or more of said load cells of said array.

22. A weight determining method according to claim 21, wherein in step (c), the processors are further used to, based on the locations of the items, determine said one or more of said load cells from which said load data is to be collected for said each of the items.

23. A weight determining method according to claim 16, wherein in step (b), the scanning apparatus is further used to read a unique identification tag associated with said each of the items; and wherein in step (c), the processors are further used to associate said unique identification tag with said weight for said each of the items.

24. A weight determining method according to claim 23, wherein in step (c), the processors are further used to generate an alert for presentation to a user when said weight differs from predetermined weight data associated with said unique identification tag.

25. A weight determining method according to claim 16, wherein in step (c), said processors are further used to, based on said scan data, determine dimension data for said each of the items.

26. A weight determining method according to claim 16 wherein before steps (a) through (c), laterally adjacent ones of said load cells are longitudinally offset from one another.

27. A weight determining method according to claim 16, wherein as the conveyor system bears said each of the items over said array, said weight for said each of the items is determined two or more times.

28. A weight determining method according to claim 16, wherein before steps (a) through (c), said array is configured, relative to the items, such that said each of the items bears upon a first set of said load cells and later, as the conveyor system bears said each of the items over said array, upon a second set of said load cells disjoint from said first set.

29. A weight determining method according to claim 16, wherein before steps (a) through (c), a size of said each of said load cells is determined based on a size of the items.

30. A weight determining system according to claim 16, further comprising a step of using the weight for recovery of costs associated with the items on the conveyor system.

31. A non-transitory, tangible computer readable medium for use with:
singulated, non-singulated, spaced, and non-spaced arrangements of items on a conveyor system; an array of load cells associated with the conveyor system, with the array configured to have each of the items bear upon one or more of the load cells, wherein said each of the items is in adjacent and/or neighboring relation with said one or more of said load cells, and with each of the load cells configured to bear one or more of the items and generate load data associated with said one or more of the items;

and a scanning apparatus which generates scan data corresponding to the arrangements of the items on the conveyor system;

with the computer readable medium comprising executable instructions which are physically stored thereon and which, upon execution, encode one or more processors to:

(a) collect the load data and the scan data; and
(b) based on the scan data:
- (i) apportion the load data, from said each of said load cells, to said one or more of the items which are in said adjacent and/or neighboring relation therewith;
- (ii) allocate the load data, apportioned as aforesaid, to said each of the items from said one or more of said load cells which are in said adjacent and/or neighboring relation therewith; and
- (iii) determine a weight for said each of the items in the arrangements based on the load data apportioned and allocated as aforesaid.

* * * * *